US 12,325,281 B2

(12) United States Patent
Benouali et al.

(10) Patent No.: US 12,325,281 B2
(45) Date of Patent: Jun. 10, 2025

(54) HEAT TRANSFER LIQUID CIRCUIT

(71) Applicant: Valeo Systemes Thermiques, Le Mesnil Saint-Denis (FR)

(72) Inventors: Jugurtha Benouali, Le Mesnil Saint-Denis (FR); Thierry Raux, Le Mesnil Saint-Denis (FR); Philippe Zevaco, Le Mesnil Saint-Denis (FR)

( * ) Notice: Subject to any disclaimer, the term of this patent is extended or adjusted under 35 U.S.C. 154(b) by 830 days.

(21) Appl. No.: 17/275,431

(22) PCT Filed: Sep. 10, 2019

(86) PCT No.: PCT/FR2019/052082
§ 371 (c)(1),
(2) Date: Mar. 11, 2021

(87) PCT Pub. No.: WO2020/053516
PCT Pub. Date: Mar. 19, 2020

(65) Prior Publication Data
US 2022/0048363 A1    Feb. 17, 2022

(30) Foreign Application Priority Data
Sep. 12, 2018  (FR) ..................................... 1858148

(51) Int. Cl.
*B60H 1/00*        (2006.01)
*B60H 1/22*        (2006.01)
(Continued)

(52) U.S. Cl.
CPC ..... *B60H 1/00885* (2013.01); *B60H 1/00278* (2013.01); *B60H 1/00385* (2013.01);
(Continued)

(58) Field of Classification Search
None
See application file for complete search history.

(56) References Cited

U.S. PATENT DOCUMENTS 9,844,995 B2 * 12/2017 Rawlinson ......... B60H 1/32281
10,173,491 B2 * 1/2019 Kim .................... B60H 1/00007
(Continued)

FOREIGN PATENT DOCUMENTS

CN        102548780 A    7/2012
CN        202657025 U    1/2013
(Continued)

OTHER PUBLICATIONS

JP-6015184-B2 English Machine Translation (Year: 2016).*
(Continued)

*Primary Examiner* — Jenna M Maroney
(74) *Attorney, Agent, or Firm* — Osha Bergman Watanabe & Burton LLP

(57) ABSTRACT

A heat-transfer liquid circuit for an electric vehicle propelled, at least in part, by an electric motor, the circuit including a first leg, and the first leg includes, at least, a pump, a first heat exchanger configured to exchange heat energy between the heat-transfer liquid and a refrigerant fluid, an electric-heating device, and a second heat exchanger configured to exchange heat energy between the heat transfer liquid and a flow of air dispatched towards the interior of the vehicle. The circuit also includes a second leg, and the second leg includes a third heat exchanger thermally coupled to a component of an electric drivetrain of the vehicle. The circuit further includes a third leg arranged in parallel with the first leg and connected to the latter by a member for distributing the heat-transfer liquid.

9 Claims, 9 Drawing Sheets

(51) Int. Cl.
*B60H 1/32* (2006.01)
*B60L 1/02* (2006.01)
*B60L 58/26* (2019.01)

(52) U.S. Cl.
CPC ....... *B60H 1/2221* (2013.01); *B60H 1/32281* (2019.05); *B60L 1/02* (2013.01); *B60H 2001/00928* (2013.01); *B60L 58/26* (2019.02)

(56) References Cited

U.S. PATENT DOCUMENTS

| | | | | |
|---|---|---|---|---|
| 10,625,563 | B2* | 4/2020 | Kim | B60H 1/00885 |
| 11,338,647 | B1* | 5/2022 | Johnston | B60H 1/00271 |
| 11,752,836 | B1* | 9/2023 | Johnston | B60H 1/00485 |
| | | | | 62/239 |
| 2015/0121922 | A1* | 5/2015 | Chang | B60H 1/00907 |
| | | | | 62/126 |
| 2015/0273976 | A1* | 10/2015 | Enomoto | B60L 3/0046 |
| | | | | 62/243 |
| 2015/0362268 | A1* | 12/2015 | Maeda | B60H 1/00885 |
| | | | | 165/294 |
| 2019/0047363 | A1* | 2/2019 | Sonnekalb | B60H 1/00371 |
| 2019/0047365 | A1* | 2/2019 | Sonnekalb | B60H 1/32284 |
| 2019/0145675 | A1* | 5/2019 | Kim | B60H 1/00342 |
| | | | | 62/324.6 |
| 2019/0263223 | A1* | 8/2019 | Durrani | B60H 1/00921 |
| 2020/0189357 | A1* | 6/2020 | Chopard | B60H 1/00499 |
| 2020/0220236 | A1* | 7/2020 | Durrani | H01M 10/667 |
| 2022/0048363 | A1* | 2/2022 | Benouali | B60H 1/32281 |
| 2022/0410653 | A1* | 12/2022 | Li | B60H 1/00885 |

FOREIGN PATENT DOCUMENTS

| | | | | |
|---|---|---|---|---|
| CN | 102941791 | A | 2/2013 | |
| CN | 107031347 | A | 8/2017 | |
| CN | 108407568 | A | 8/2018 | |
| DE | 102016200362 | A1 * | 7/2017 | ......... B60H 1/00278 |
| DE | 102018117099 | A1 * | 1/2020 | ......... B60H 1/00278 |
| DE | 102020100428 | A1 * | 8/2020 | ......... B60H 1/00007 |
| DE | 102020107111 | A1 * | 11/2020 | ......... B60H 1/00278 |
| EP | 1291206 | A1 | 3/2003 | |
| EP | 2263894 | A1 | 12/2010 | |
| EP | 2817163 | B1 * | 3/2019 | ......... B60H 1/00271 |
| FR | 2992260 | A1 * | 12/2013 | ......... B60H 1/00271 |
| FR | 3052236 | A1 | 12/2017 | |
| FR | 3057494 | A1 * | 4/2018 | ......... B60H 1/00492 |
| FR | 3082784 | A1 * | 12/2019 | |
| JP | 6015184 | B2 * | 10/2016 | ......... B60H 1/00885 |
| KR | 102080803 | B1 * | 11/2019 | |
| WO | 2013/124173 | A1 | 8/2013 | |
| WO | WO-2014013670 | A1 * | 1/2014 | ......... B60H 1/00885 |
| WO | WO-2014185150 | A1 * | 11/2014 | ......... B60H 1/00914 |
| WO | WO-2015136768 | A1 * | 9/2015 | ......... B60H 1/00278 |
| WO | WO-2016096501 | A1 * | 6/2016 | ......... B60H 1/00278 |
| WO | WO-2018069629 | A1 * | 4/2018 | ......... B60H 1/00492 |
| WO | WO-2018105927 | A1 * | 6/2018 | ............ B60H 1/00 |
| WO | WO-2019026528 | A1 * | 2/2019 | ......... B60H 1/00021 |
| WO | WO-2019058838 | A1 * | 3/2019 | ......... B60H 1/00278 |
| WO | WO-2019138731 | A1 * | 7/2019 | ......... B60H 1/00278 |
| WO | WO-2020053516 | A1 * | 3/2020 | ......... B60H 1/00278 |

OTHER PUBLICATIONS

International Search Report with Written Opinion in corresponding International Application No. PCT/FR2019/052082, mailed Dec. 13, 2019 (11 pages).

Office Action issued in counterpart Chinese application No. 201980060066.0, dated Dec. 22, 2023 (7 pages).

Office Action issued in counterpart Chinese Patent Application No. 201980060066.0 mailed Oct. 1, 2024 (12 pages).

* cited by examiner

HEAT TRANSFER LIQUID CIRCUIT

The field of the present invention is that of heat-transfer liquid circuits used for heating or cooling a space or a component of a vehicle, in particular for a motor vehicle.

Motor vehicles are currently equipped with a heat-transfer liquid circuit used to heat or cool various spaces or various components of the vehicle. It is in particular known to use this heat-transfer liquid circuit to maintain an electrical-energy storage device of an electric powertrain of the vehicle at a constant temperature, the electrical-energy storage device being used to supply electrical energy capable of propelling the vehicle. Thus, the heat-transfer liquid circuit can cool the electrical-energy storage device while it is being used in a driving phase, the heat-transfer liquid circuit also being able to heat the electrical-energy storage device when necessary, for example when the vehicle is at a standstill.

It is also known to use such a heat-transfer liquid circuit in order to thermally treat a flow of air sent into the vehicle interior, thereby making it possible to increase or reduce the temperature of the vehicle interior.

The known heat-transfer liquid circuit uses numerous components that each carry out a specific task, this involving particularly complicated routing of the heat-transfer liquid circuit, thereby forming a drawback of the known heat-transfer liquid circuit.

The aim of the present invention is to propose a heat-transfer liquid circuit that makes it possible, at an acceptable cost and with a limited number of components, to carry out at least five functions, including a function of heating the vehicle interior using an electric heating device, a function of cooling the vehicle interior, a function of heating or cooling an electrical-energy storage device, a function of heating the vehicle interior using a refrigerant loop, and finally a function of recovering energy from a component of the electric powertrain of the vehicle.

The invention achieves this aim, according to a first aspect, by virtue of a heat-transfer liquid circuit for an electric vehicle that is propelled at least in part by an electric motor, the circuit comprising a first leg that has at least one pump, a first heat exchanger configured to exchange heat energy between the heat-transfer liquid and a refrigerant, an electric heating device and a second heat exchanger configured to exchange heat energy between the heat-transfer liquid and a flow of air intended to be sent into a vehicle interior, the circuit comprising a second leg that is mounted in parallel with the first leg, the second leg comprising a third heat exchanger thermally coupled to a component of an electric powertrain of the vehicle, characterized in that the circuit comprises a third leg that is disposed in parallel with the first leg and connected to the latter by a member for distributing the heat-transfer liquid.

According to one example, the distribution member distributes the heat-transfer liquid to the second leg and/or to the third leg.

The vehicle is electric in that it is propelled at least in part by virtue of an electric motor. This is the case in a hybrid vehicle, which also uses an internal combustion engine to move around. Advantageously, the vehicle is propelled exclusively by an electric means, in particular one or more electric motors. Thus, the component of the electric powertrain may be, for example, a main electric motor for moving the vehicle, an energy storage device that supplies the main motor with electrical energy, or an electronic power module that makes it possible, for example, to convert or deliver the electrical energy to the main electric motor. Thus, according to one exemplary embodiment of this configuration, the heat-transfer liquid circuit makes it possible to maintain a stable or substantially stable temperature at the energy storage device in order to ensure greater longevity of the energy storage device.

The distribution member is for example a three-way valve, each of the ways being able to be configured in an open position, in which the heat-transfer liquid circulates, or in a closed position in which the heat-transfer liquid is stopped, thereby allowing several configurations of circulation of the heat-transfer liquid in the circuit.

The third leg extends between an upstream part of the first leg and a downstream part of the first leg, in the direction of circulation of the heat-transfer liquid. In other words, the start of the third leg is situated upstream of a first component, in the direction of circulation of the heat-transfer liquid, of the first leg, the first leg and the third leg thus forming a first junction. The end of the third leg is situated downstream of a final component, in the direction of circulation of the heat-transfer liquid, of the first leg, the first leg and the third leg thus forming a second junction, the distribution member being situated at the first junction or the second junction. Thus, when the heat-transfer liquid passes through the third leg, it does not circulate through any of the components of the first leg, the components of the first leg being at least the pump, the first heat exchanger, the electric heating device, such as an electric radiator, and the second heat exchanger.

This configuration according to the first aspect of the invention thus makes it possible to pool the heating function of the electric heating device of the first leg in order to allow the heating of several components or spaces of the vehicle, such as a component of the electric powertrain or the vehicle interior.

The heat-transfer liquid circuit according to the first aspect of the invention advantageously comprises at least one of the following refinements, the technical features forming these refinements being able to be considered individually or in combination:

the components of the first leg are mounted in series with one another. In other words, the heat-transfer liquid, when it circulates in the first leg, passes through a first component of the first leg, then through a second component of the first leg;

the electric heating device is interposed between the first heat exchanger and the second heat exchanger. Advantageously, within the first leg, the heat-transfer liquid passes through the first heat exchanger, then the electric heating device, and then finally the second heat exchanger. According to a first alternative, the pump is situated downstream of the other components of the first leg, in the direction of circulation of the heat-transfer liquid, meaning that the heat-transfer liquid passes first of all through the first heat exchanger, then the electric heating device, then the second heat exchanger, and then finally the pump. According to a second alternative, the order of the components in the first leg may be chosen from any of the possible combinations;

the electric heating device is configured to heat the heat-transfer liquid using high-voltage electrical energy. Thus, the electric heating device is supplied with electrical power at a voltage strictly greater than 48 volts, preferably between 48 volts and 800 volts;

the pump is interposed between the distribution member and the second heat exchanger;

the third leg does not have a heat exchanger. In other words, the third leg is a pipe;

the circuit comprises a fourth leg that is mounted in parallel with the second leg and connected thereto by a branching device, the fourth leg comprising a fourth heat exchanger configured to exchange heat energy between the heat-transfer liquid and a refrigerant. Thus, the second leg and the fourth leg form a third junction and a fourth junction, the branching device being situated at the third junction or the fourth junction. The branching device is for example a three-way valve, each of the ways being able to be configured in an open position in which the heat-transfer liquid circulates, or in a closed position in which the circulation of the heat-transfer liquid is interrupted, thereby allowing several configurations of circulation of the heat-transfer liquid in the circuit;

the second leg comprises a pump, referred to as the second pump, that is different than the pump in the first leg, referred to as the first pump below. The second pump allows the heat-transfer liquid to circulate within the second leg and/or the fourth leg. Thus, the heat-transfer liquid can be set in circulation within the second leg, and/or the fourth leg, independently of the circulation of the heat-transfer liquid in the first and/or the second leg;

the first leg and/or the second leg comprises at least one nonreturn valve. The nonreturn valve makes it possible to ensure the direction of circulation of the heat-transfer liquid in the first leg and/or the second leg. Advantageously, the nonreturn valve is situated upstream, in the direction of circulation of the heat-transfer liquid, of an inlet junction between the first leg and the third leg or of a second inlet junction between the second leg and the fourth leg. Preferably, the nonreturn valve ensures the direction of circulation of the heat-transfer liquid in the first leg from the inlet junction to an outlet junction. Similarly, preferably, the nonreturn valve ensures the direction of circulation of the heat-transfer liquid in the second leg from the second inlet junction to a second outlet junction. In particular, the first junction constitutes the inlet junction, the second junction constitutes the outlet junction, the third junction constitutes the second inlet junction, and the fourth junction constitutes the second outlet junction;

the circuit comprises a fifth leg disposed in parallel with the first leg, the fifth leg comprising a fifth heat exchanger configured to effect heat exchange between the heat-transfer liquid and a flow of air exterior to the vehicle interior;

the fifth leg comprises a shut-off valve. The shut-off valve of the fifth leg makes it possible to allow or prevent the circulation of the heat-transfer liquid in the fifth leg. The shut-off valve may be situated upstream or downstream, in the direction of circulation of the heat-transfer liquid, of the fifth heat exchanger;

the circuit comprises a sixth leg disposed in parallel with the second leg, the sixth leg comprising a sixth heat exchanger thermally coupled to a component of the electric powertrain of the vehicle, referred to as the second component, which is different than the component, referred to as the first component, that is thermally coupled to the third heat exchanger present in the second leg of the circuit;

the sixth leg comprises a seventh heat exchanger in series with the sixth heat exchanger;

the sixth leg comprises a pump, which is referred to as the third pump and is separate from the first pump present in the first leg and from the second pump present in the second leg. Thus, the heat-transfer liquid can circulate in the fifth and/or the sixth leg independently of its circulation in the first leg, the second leg, the third leg or the fourth leg;

the sixth leg comprises at least one shut-off member. The shut-off member may be for example a two-way valve or a nonreturn valve;

the heat-transfer liquid is water or an aqueous solution comprising ethylene glycol, or any other chemical compound. This configuration makes it possible to use the heat-transfer liquid circuit when the vehicle is stored or used at outside temperatures less than 0° C., the use of ethylene glycol making it possible to reduce the solidification temperature of the heat-transfer liquid and thus to avoid damage to the elements of the circuit when the latter is exposed to negative outside temperatures. Advantageously, the heat-transfer liquid also comprises an anticorrosion additive that protects the circuit from corrosion.

According to a second aspect, a further subject of the invention is the use of a circuit according to the first aspect of the invention, wherein, in a mode heating the vehicle interior, the distribution member forces the heat-transfer liquid to circulate from the first leg to the third leg, the pump of the first leg being activated, the electric heating device preferably being supplied with power.

In this mode, the circulation of the heat-transfer liquid is interrupted at the second leg, the fourth leg, the fifth leg and the sixth leg. For example, the second pump and the third pump are interrupted or inactive, allowing the heat-transfer liquid, by way of the configuration of the distribution member preventing the heat-transfer liquid from circulating between the first leg, the fifth leg and the sixth leg, to circulate only in the first leg and the third leg.

Thus, when the electric heating device generates heat energy, this is transmitted by the heat-transfer liquid to the second heat exchanger, making it possible to exchange this heat energy with the flow of air passing through the second heat exchanger in order to heat the vehicle interior.

According to a third aspect, a further subject of the invention is the use of a circuit according to the first aspect of the invention, wherein, in a mode heating the first component of the electric powertrain of the vehicle, the distribution member and the branching device force the heat-transfer liquid to circulate from the first leg to the second leg, the pump of the first leg and/or the pump of the second leg being activated.

The heating of the heat-transfer liquid can be obtained by supplying the heating heating device with electrical power or by the exchange of heat energy between the first heat exchanger and the heat-transfer liquid, the first heat exchanger being thermally coupled to a refrigerant loop.

In this mode, the circulation of the heat-transfer liquid is interrupted at the third leg, the fourth leg, the fifth leg and the sixth leg. For example, the third pump is deactivated, the shut-off member preventing the heat-transfer liquid from circulating in the sixth leg, the shut-off valve situated on the fifth leg being in a closed position, the distribution device and the branching device preventing the heat-transfer liquid from circulating in the third leg and in the fourth leg, respectively.

Thus, the heat-transfer liquid can exchange heat energy, generated by the electric heating device or picked up at the first heat exchanger, with the third heat exchanger situated on the second leg, allowing the first component of the electric powertrain of the vehicle to be heated. Advantageously, the first component of the electric powertrain is, in this mode, an energy storage device, the heating of the energy storage device making it possible, when the conditions require this, for example in the case of low outside temperatures, to increase the temperature of the energy storage device in order to increase the longevity thereof.

According to a fourth aspect, a further subject of the invention is the use of a circuit according to the first aspect of the invention, wherein, in a mode cooling the first component of the electric powertrain of the vehicle, the branching device forces the heat-transfer liquid to circulate between the second leg and the fourth leg, the second pump being activated.

Thus, the heat-transfer liquid can exchange heat energy, generated at the first component of the electric powertrain and picked up by the third heat exchanger, with the fourth heat exchanger.

Advantageously in this mode, the use of the circuit also makes it possible to cool the second component of the electric powertrain and/or the third component of the electric powertrain, which are present in the sixth leg. Thus, the distribution member forces the heat-transfer liquid to circulate between the first leg and the fifth leg, the branching device preventing the heat-transfer liquid from circulating between the second leg and the sixth leg, the first and the third pump being activated. Thus, the heat-transfer liquid can pick up heat energy generated by the second component and/or the third component of the electric powertrain and offload it at the fifth heat exchanger present in the fifth leg, the heat energy then being dissipated through the flow of air intended to be sent to the outside of the vehicle interior. This effect is also obtained by configuring the distribution member such that it prevents the heat-transfer liquid from circulating in the third leg, the heat-transfer liquid picking up the heat energy of the refrigerant at the first heat exchanger, the refrigerant thus likewise ensuring the cooling of the first component of the electric powertrain by way of the third heat exchanger situated in the fourth leg, the third heat exchanger being coupled to the refrigerant loop.

Thus, the circuit makes it possible to achieve the cooling of the first component of the electric powertrain independently of the cooling of the second and/or the third component of the electric powertrain of the vehicle.

According to a fifth aspect, a subject of the invention is the use of a circuit according to the first aspect of the invention, wherein, in a mode cooling a main electric motor of the vehicle, which is thermally coupled to the sixth heat exchanger or the seventh heat exchanger, and cooling the vehicle interior, the distribution member forces the heat-transfer liquid to circulate between the first leg and the fifth leg, the first pump and the third pump being activated.

Thus, the distribution member prevents the heat-transfer liquid from circulating between the first leg and the third leg. The second pump is inactive and the branching device prevents the heat-transfer liquid from circulating between the second leg and the fourth leg.

Thus, in this mode, the heat-transfer liquid picks up the heat energy generated by the electric motor, the electric motor then being the second component or the third component of the electric powertrain, this heat energy then being dissipated at the fifth heat exchanger present in the fifth leg. This mode also allows the heat-transfer liquid to be cooled at the first heat exchanger of the first leg, by way of a refrigerant circuit, the heat-transfer liquid then cooling, at the second heat exchanger, the flow of air sent into the vehicle interior.

According to a sixth aspect, the invention relates to the use of a circuit according to the first aspect of the invention, wherein, in a mode recovering the energy from a component of the electric powertrain that is thermally coupled to a heat exchanger situated on the sixth leg, the branching device forces the heat-transfer liquid to circulate between the fourth leg and the sixth leg, the third pump being activated.

In this mode, the heat-transfer liquid picks up heat energy generated by a component of the electric powertrain that is thermally coupled to a heat exchanger of the sixth leg, this heat energy then being dissipated when the heat-transfer liquid passes through the fourth heat exchanger that is present in the fourth leg and connected to a refrigerant circuit. In addition, the circulation of the heat-transfer liquid is interrupted in the second leg by the branching device, the second pump being deactivated. Thus, this configuration makes it possible to avoid cooling of the first component of the electric powertrain that is thermally coupled to the third heat exchanger situated in the second leg, in particular when the first component of the electric powertrain is an energy storage device of the vehicle.

Moreover, the circulation of the heat-transfer liquid can also be interrupted in the first leg, in the third leg and in the fifth leg, for example on account of the configuration of the distribution member in relation to the first leg and the third leg, and of the shut-off valve in relation to the fifth leg.

Further features, details and advantages of the invention will become more clearly apparent from reading the following description, and also from a number of exemplary embodiments given by way of nonlimiting indication, with reference to the appended schematic drawings, in which.

The features, variants and different embodiments of the invention can be combined with one another, in various combinations, provided that they are not mutually incompatible or exclusive. It will be possible, in particular, to imagine variants of the invention that comprise only a selection of the features described below, in isolation from the other features described, if this selection of features is sufficient to confer a technical advantage or to distinguish the invention from the prior art.

In particular, all of the variants and all of the embodiments described are able to be combined with one another if there is no technical reason preventing this combination.

The terms upstream and downstream used in the following description relate to the direction of circulation of the heat-transfer liquid in the circuit.

In FIGS. 5 to 9, the solid lines illustrate a portion of circuit in which the heat-transfer liquid circulates or an active component of the circuit, while the dashed lines illustrate a lack of circulation of the heat-transfer liquid or a passive component of the circuit. In these figures, the direction of circulation of the heat-transfer liquid is symbolized by an arrow.

Figure 1:
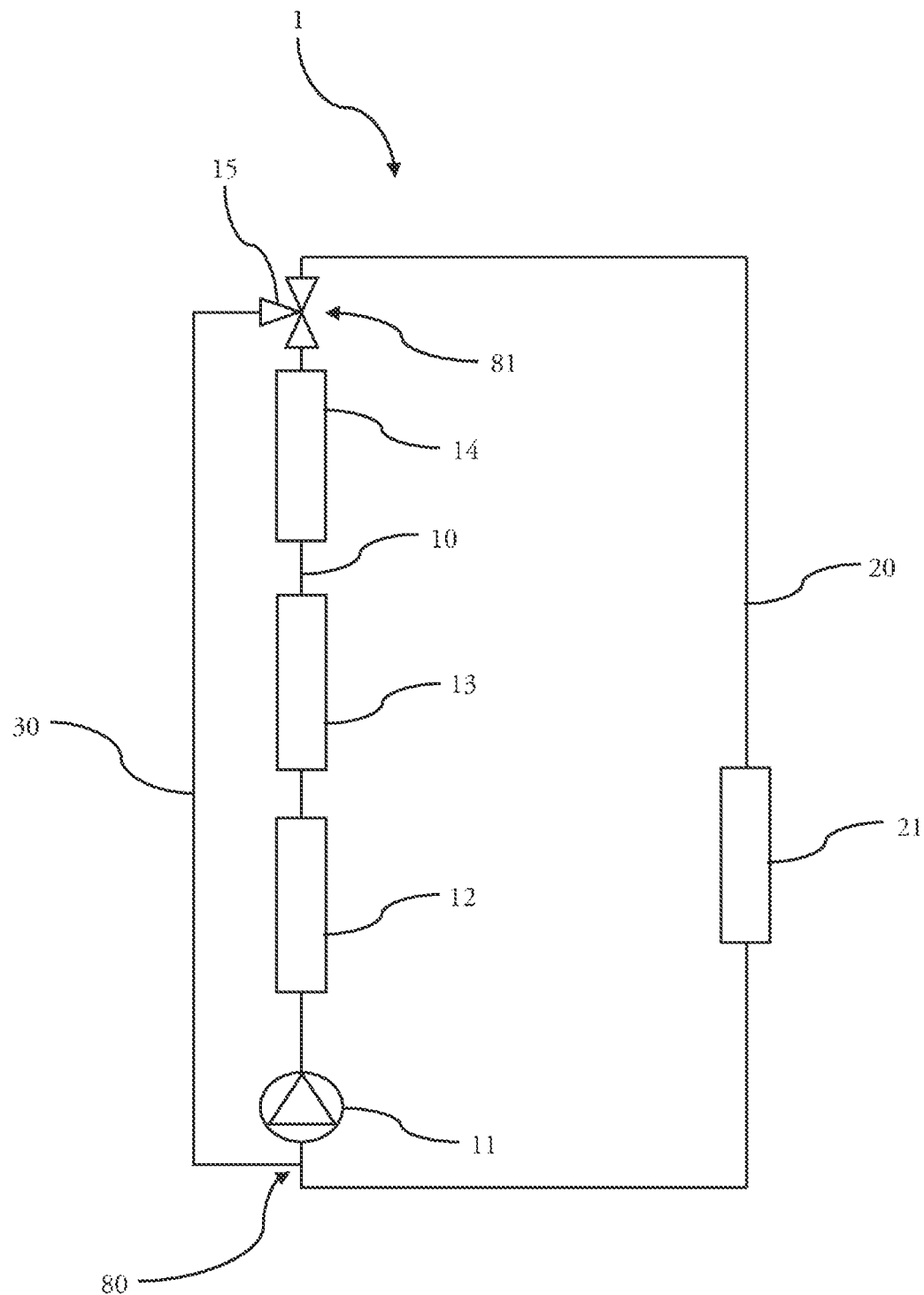
FIG. 1 is a schematic depiction of a first exemplary embodiment of a heat-transfer liquid circuit according to the first aspect of the invention.

FIG. 1 illustrates a schematic depiction of a first exemplary embodiment of a heat-transfer liquid circuit 1 according to the first aspect of the invention.

The circuit 1 is designed to be used in an electric vehicle propelled at least partially by electrical energy. Thus, the heat-transfer liquid circuit 1 comprises a first leg 10 and a second leg 20, the first leg 10 and the second leg 20 forming a loop. The first leg 10 comprises a first pump 11, a first heat exchanger 12, an electric heating device 13 and a second heat exchanger 14. The second leg 20 comprises a third heat exchanger 21 thermally coupled to a component of an electric powertrain of the electric vehicle in which the circuit 1 is mounted.

The first pump 11 sets the heat-transfer liquid in circulation within the circuit 1. The first heat exchanger 12 allows the exchange of heat energy between the heat-transfer liquid and a refrigerant circulating in a refrigerant circuit FR with which the vehicle is equipped. The electric heating device 13, which is supplied with power by a power source 100, makes it possible to convert electrical energy into thermal energy, in order to heat the heat-transfer liquid, thereby allowing the heating of a component or of a fluid such as a flow of air thermally coupled to the heat-transfer liquid circuit 1 The second heat exchanger 14 makes it possible to exchange heat energy between the heat-transfer liquid passing through it and a flow of air intended to be sent into the vehicle interior. The first heat exchanger 12 is interposed between the first pump 11 and the electric heating device 13, the electric heating device 13 itself being interposed between the first heat exchanger 12 and the second heat exchanger 14.

The circuit 1 comprises a third leg 30 that is disposed in parallel with the first leg 10 and connected to the latter by a member 15 for distributing the heat-transfer liquid between the first leg 10, the second leg 20 and the third leg 30. The distribution member 15 is in this case a three-way valve, each way being able to be configured independently in an open position allowing the circulation of the heat-transfer liquid or in a closed position preventing the circulation of the heat-transfer liquid. The first leg 10 and the third leg 30 thus form a first junction 80 and a second junction 81, the distribution member 15 being situated at the second junction 81. The first pump 11, the first heat exchanger 12, the electric heating device 13 and the second heat exchanger 14 are situated, on the first leg 10, between the first junction 80 and the second junction 81.

Figure 2:
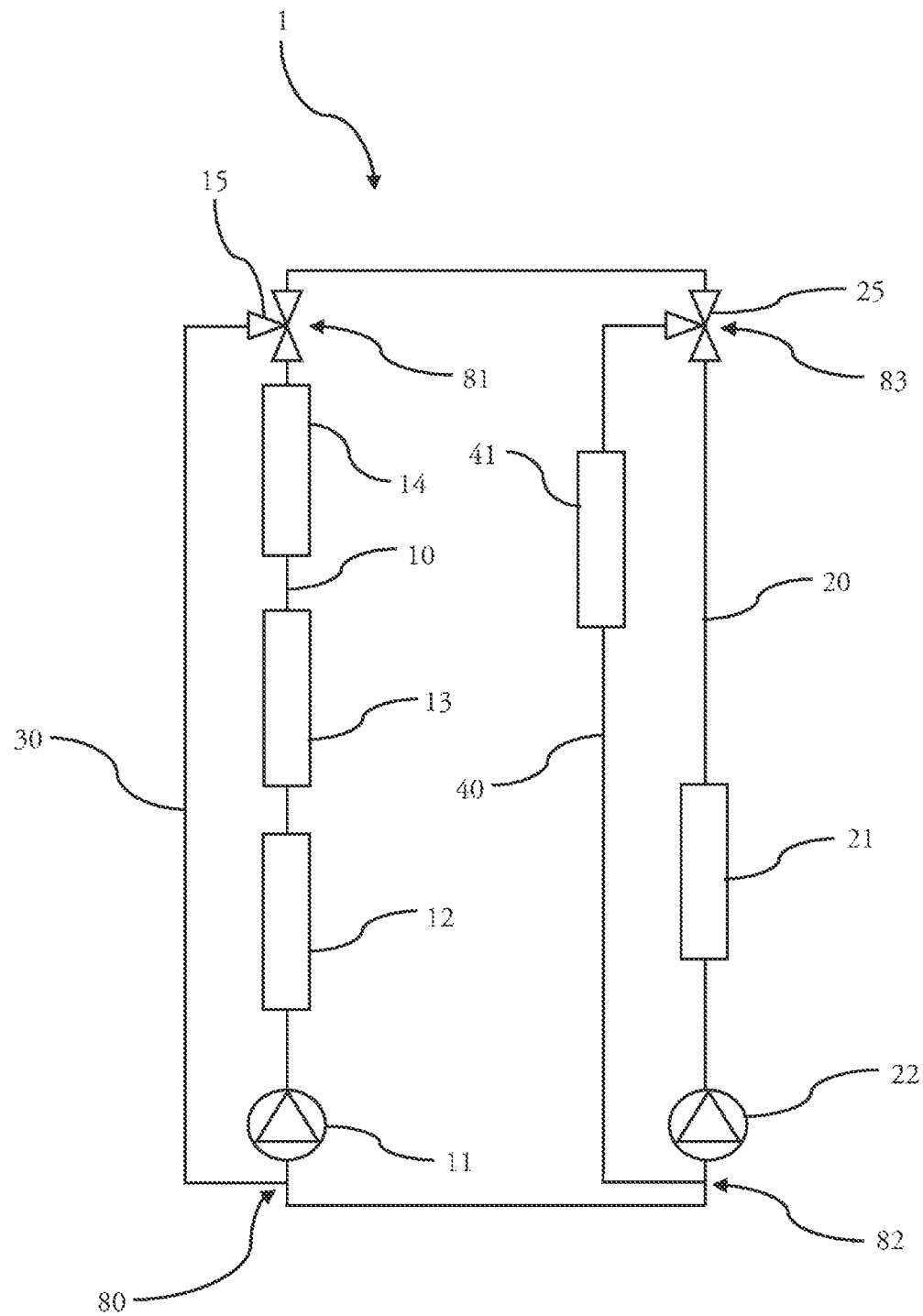
FIG. 2 is a schematic depiction of a second exemplary embodiment of a heat-transfer liquid circuit according to the first aspect of the invention.

FIG. 2 illustrates a second exemplary embodiment of a circuit 1 according to the first aspect of the invention. The circuit 1 comprises a fourth leg 40 disposed in parallel with the second leg 20, the second leg and the fourth leg 40 being connected by a branching device 25, the branching device 25 being in this case a three-way valve. Thus, the second leg 20 and the fourth leg 40 form a third junction 82 and a fourth junction 83, the third heat exchanger 21 being situated, on the second leg 20, between the third junction 82 and the fourth junction 83, the branching device 25 being situated at the fourth junction 83.

The fourth leg 40 comprises a fourth heat exchanger 41 configured to exchange heat energy between the heat-transfer liquid and a refrigerant circulating in the refrigerant circuit FR with which the vehicle is equipped. Thus, the first heat exchanger 12 and the fourth heat exchanger 41 are thermally coupled to the same refrigerant circuit FR.

The second leg 20 comprises a second pump 22, thus allowing the heat-transfer liquid to be set in circulation independently of the operation of the first pump 11. The second pump 22 is interposed between the third junction 82 and the third heat exchanger 21.

Figure 3:
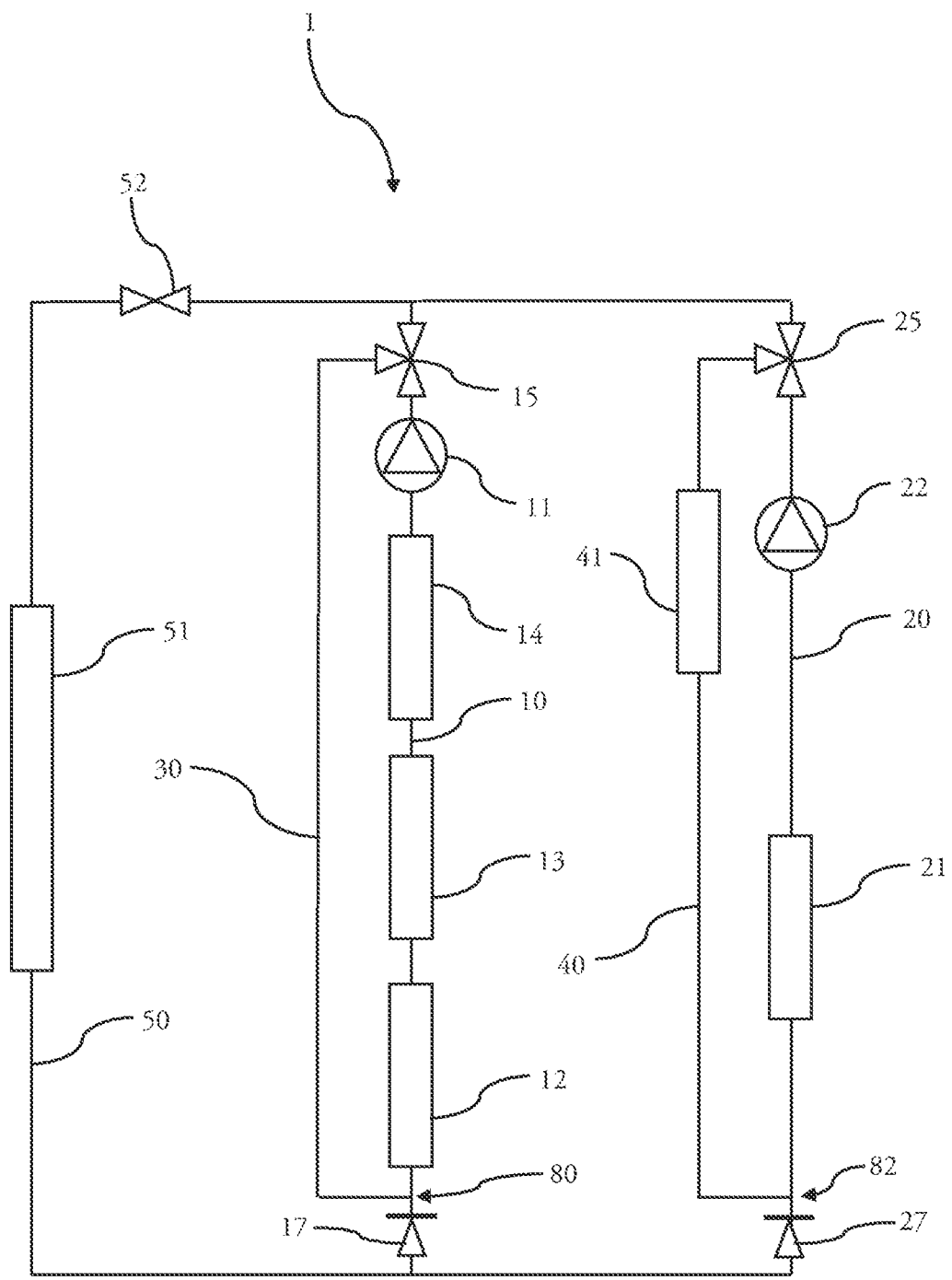
FIG. 3 is a schematic depiction of a third exemplary embodiment of a heat-transfer liquid circuit according to the first aspect of the invention.

FIG. 3 illustrates a third exemplary embodiment of a circuit 1 according to the first aspect of the invention. The circuit i comprises a fifth leg 50 disposed in parallel with the first leg 10. The fifth leg 50 comprises a fifth heat exchanger 51 configured to effect heat exchange between the heat-transfer liquid and a flow of air exterior to the vehicle interior.

The fifth leg 50 comprises a shut-off valve 52, thereby allowing or preventing the circulation of the heat-transfer liquid in the fifth leg 50.

In this exemplary embodiment, the first pump 11 is interposed between the second heat exchanger 14 and the distribution member 15. Similarly, the second pump 22 is interposed between the third heat exchanger 21 and the branching device 25.

Figure 4:
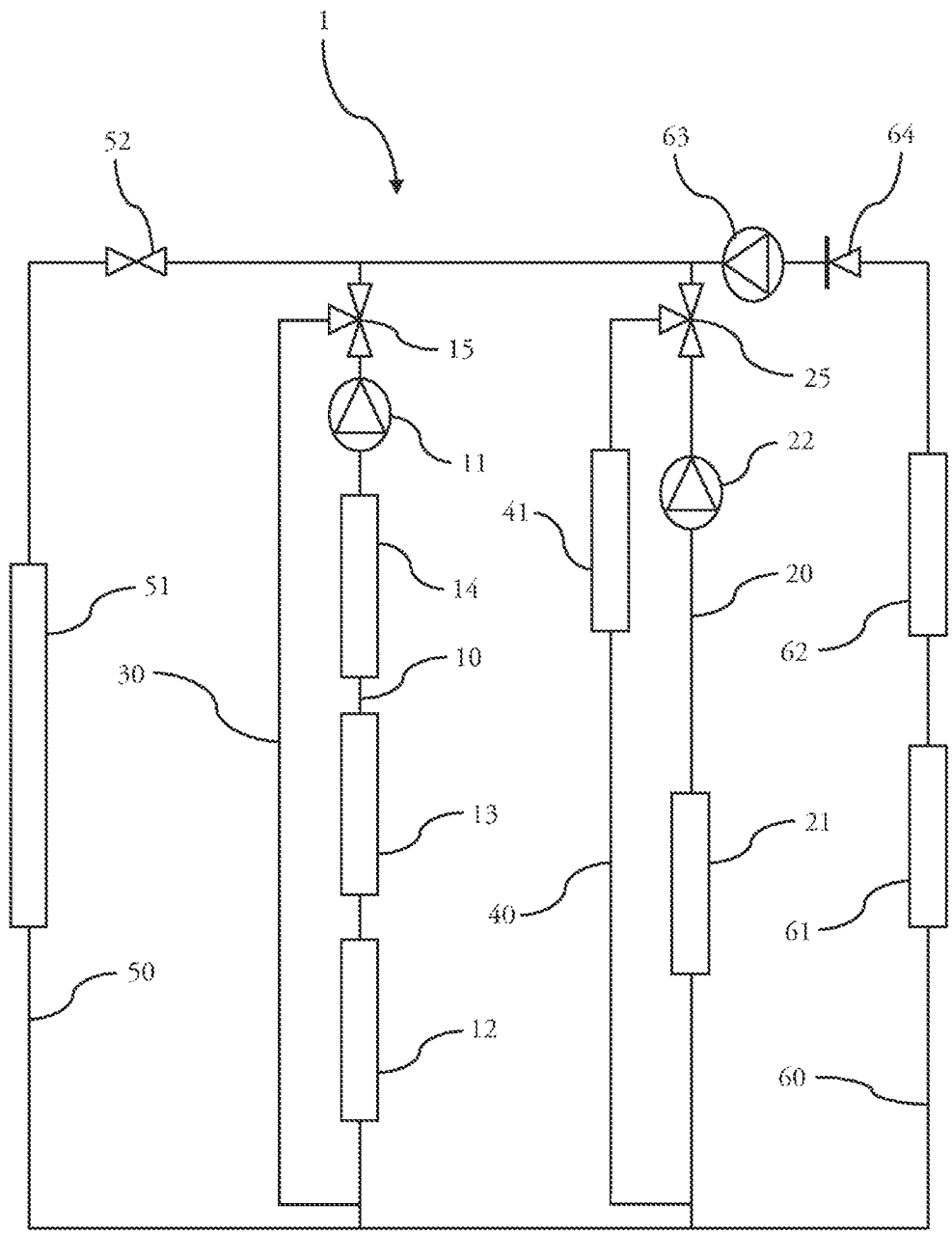
FIG. 4 is a schematic depiction of a fourth exemplary embodiment of a heat-transfer liquid circuit according to the first aspect of the invention.

The first leg io comprises a first nonreturn valve 17 disposed on the first leg 10, immediately upstream of the first junction 81 when the heat-transfer liquid comes from the fifth heat exchanger 51. Similarly, the second leg 20 comprises a second nonreturn valve 27 disposed on the second leg 20, immediately upstream of the third junction 82 when the heat-transfer liquid comes from the fifth heat exchanger 51. The first nonreturn valve 17 and the second nonreturn valve 27 make it possible to ensure the direction of circulation of the heat-transfer liquid in the first leg 10 and in the second leg 20, respectively. FIG. 4 illustrates a fourth exemplary embodiment of a circuit 1 according to the first aspect of the invention.

The circuit 1 comprises a sixth leg 60 disposed in parallel with the second leg 20. The sixth leg 60 comprises a sixth heat exchanger 61 thermally coupled to a second component, such an electric motor, of the electric powertrain of the vehicle. The sixth leg 60 comprises a seventh heat exchanger 62 in series with the sixth heat exchanger 61. The seventh heat exchanger 62 is thermally coupled to a third component, such as an electronic power module, of the electric powertrain of the vehicle.

The sixth leg 60 comprises a third pump 63 that ensures the circulation of the heat-transfer liquid in the sixth leg 60, and a third nonreturn valve 64 for ensuring the direction of circulation of the heat-transfer liquid within the sixth leg 60. The seventh heat exchanger 62 is interposed between the third nonreturn valve 64 and the sixth heat exchanger 61, the third nonreturn valve 64 itself being interposed between the third pump 63 and the seventh heat exchanger 62. Thus, within the sixth leg 60, the heat-transfer liquid passes through the sixth heat exchanger 61, the seventh heat exchanger 62, the third nonreturn valve 64 and then finally the third pump 63, in that order.

Figure 5:
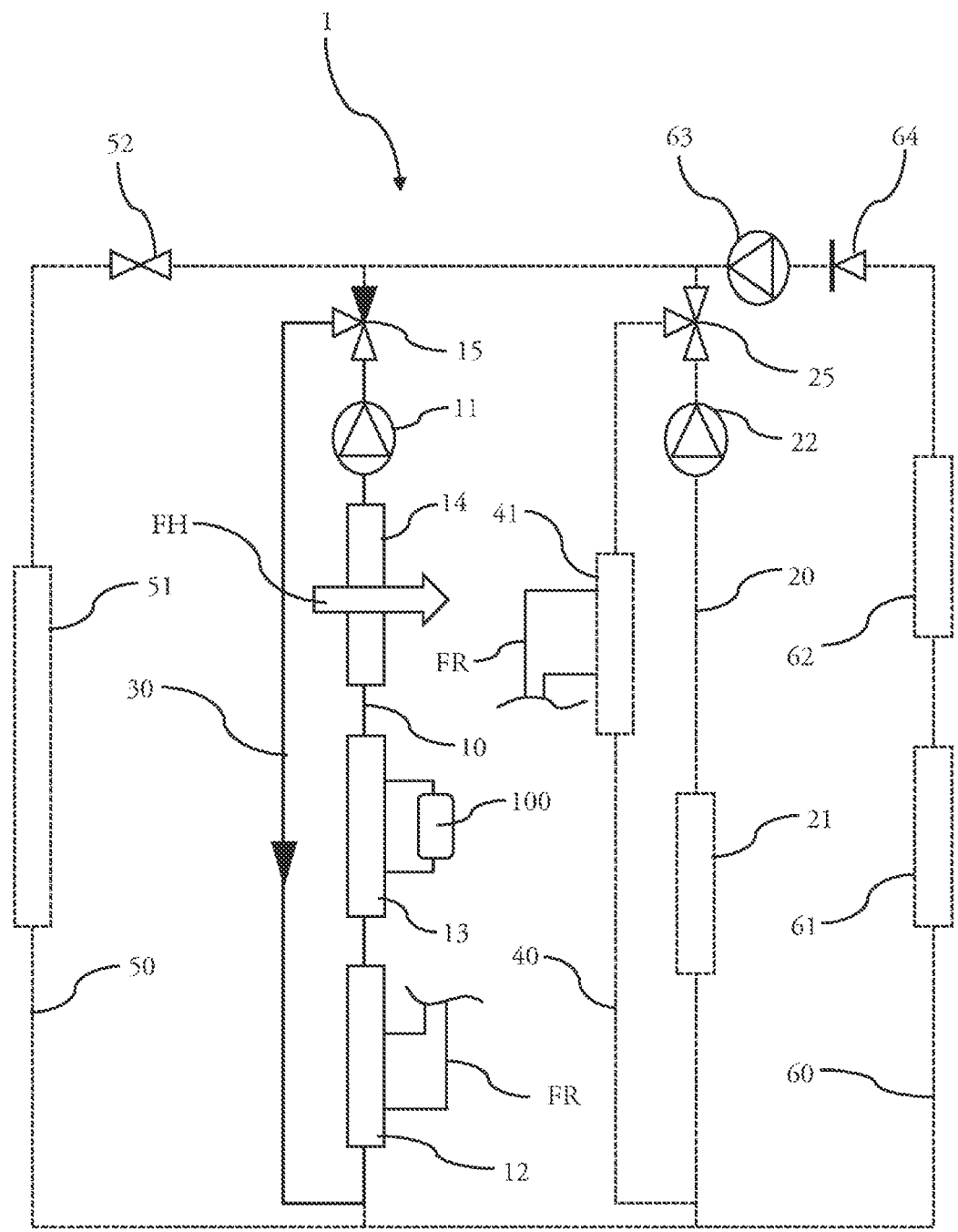
FIGS. 5 to 9 illustrate the heat-transfer liquid circuit shown in FIG. 4 in different operating modes.

FIG. 5 shows the circuit 1 illustrated in FIG. 4, the circuit 1 being used in a use mode according to the second aspect of the invention, this use mode making it possible to heat the vehicle interior. This use mode also applies to the circuits illustrated in FIGS. 1 to 3, the components of the circuit that are used in this mode likewise being present in the circuits illustrated in these figures.

Thus, the first pump 11 is active, allowing the heat-transfer liquid to circulate in the first leg 10 and in the third leg 30. Moreover, the distribution member 15 forces the heat-transfer liquid to circulate only between the first leg 10 and the third leg 30. Specifically, a valve of the three-way valve forming an example of the distribution member 15 connecting the first leg 10 to the rest of the circuit 1 is in a closed position, the heat-transfer liquid contained within the first leg 10 then only being able to circulated in the third leg 30. Thus, the heat-transfer liquid, set in motion by the first pump 11, passes through the first heat exchanger 12 and then the electric heating device 13.

The heat-transfer liquid is heated as it passes through the first heat exchanger 12 used as a condenser and/or as it passes through the electric heating device 13 supplied with power by the power source 100. The heat-transfer liquid then passes through the second heat exchanger 14, in which the heat energy of the heat-transfer liquid is dissipated through the flow of air FH intended to be sent into the vehicle interior, thereby making it possible to heat the vehicle interior. The heat-transfer liquid then circulates through the first pump 11 and then the distribution member 15, which then directs it into the third leg 30 in order that the heat-transfer liquid is injected into the first leg 10 upstream of the first heat exchanger 12 in order to effect a new circulation cycle.

The second pump 22 and the third pump 63 are inactive, thereby preventing any circulation of the heat-transfer liquid in the second leg 20, the fourth leg 40, the fifth leg 50 and the sixth leg 60.

Figure 6:
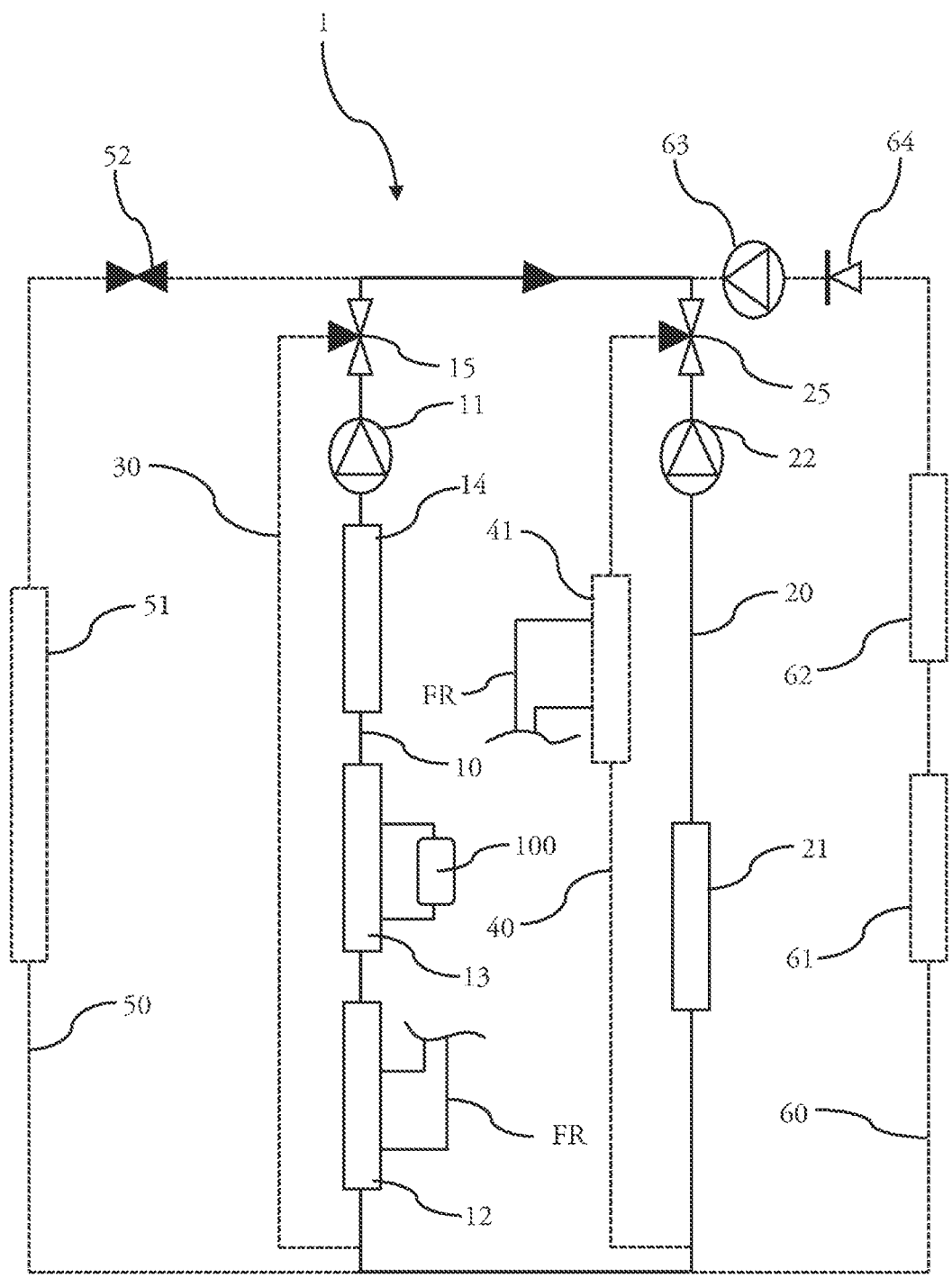

FIG. 6 shows the circuit 1 illustrated in FIG. 4, the circuit 1 being used in a use mode according to the third aspect of the invention, this use mode making it possible to heat the first component of the electric powertrain of the vehicle, the first component of the electric powertrain being thermally coupled to the third heat exchanger 21 situated on the second leg 20. This use mode also applies to the circuits illustrated in FIGS. 1 to 3, the components of the circuit that are used in this mode likewise being present in the circuits illustrated in these figures.

The distribution member 15 and the branching device 25 are configured to allow the heat-transfer liquid to circulate only in the first leg 10 and in the second leg 20. More particularly, the distribution member 15 prevents the heat-transfer liquid from circulating in the third leg 30. Similarly, the branching device 25 prevents the heat-transfer liquid from circulating in the fourth leg 40. Moreover, the shut-off valve 52 situated on the fifth leg 50 and the third nonreturn valve 64 prevent the heat-transfer liquid from circulating in the fifth leg 50 and in the sixth leg, respectively. In addition, the first pump 11 or the second pump 22 is activated in order to set the heat-transfer liquid in circulation between the first leg 10 and the second leg 20, the third pump 63 being deactivated. Depending on whether the first 11 or the second pump 22 is activated, the heat-transfer liquid circulates in a first direction or in a second direction, respectively. As illustrated in FIG. 6, the first pump 11 is activated and the second pump 22 is deactivated, the heat-transfer liquid then circulating in the first direction.

Thus, the heat-transfer liquid circulates through the first leg 10, in which it is heated, in particular by way of the first heat exchanger 12 and/or the electric radiator 13. The heat-transfer liquid then passes through the branching device 25 before circulating in the second leg 20. The heat-transfer liquid then passes through the third heat exchanger 21, where it dissipates the heat energy picked up in the first leg 10, making it possible to heat the first component of the electric powertrain of the vehicle, the first component of the electric powertrain of the vehicle advantageously being an energy storage device, such as a battery, supplying the electrical energy necessary for a main electric motor for moving the vehicle, ensuring that the energy storage device is kept at a constant temperature, in particular in the event of low outside temperatures, in order to improve the longevity of the energy storage device. The heat-transfer liquid is then injected into the first leg 10 in order to effect a new circulation cycle.

Figure 7:
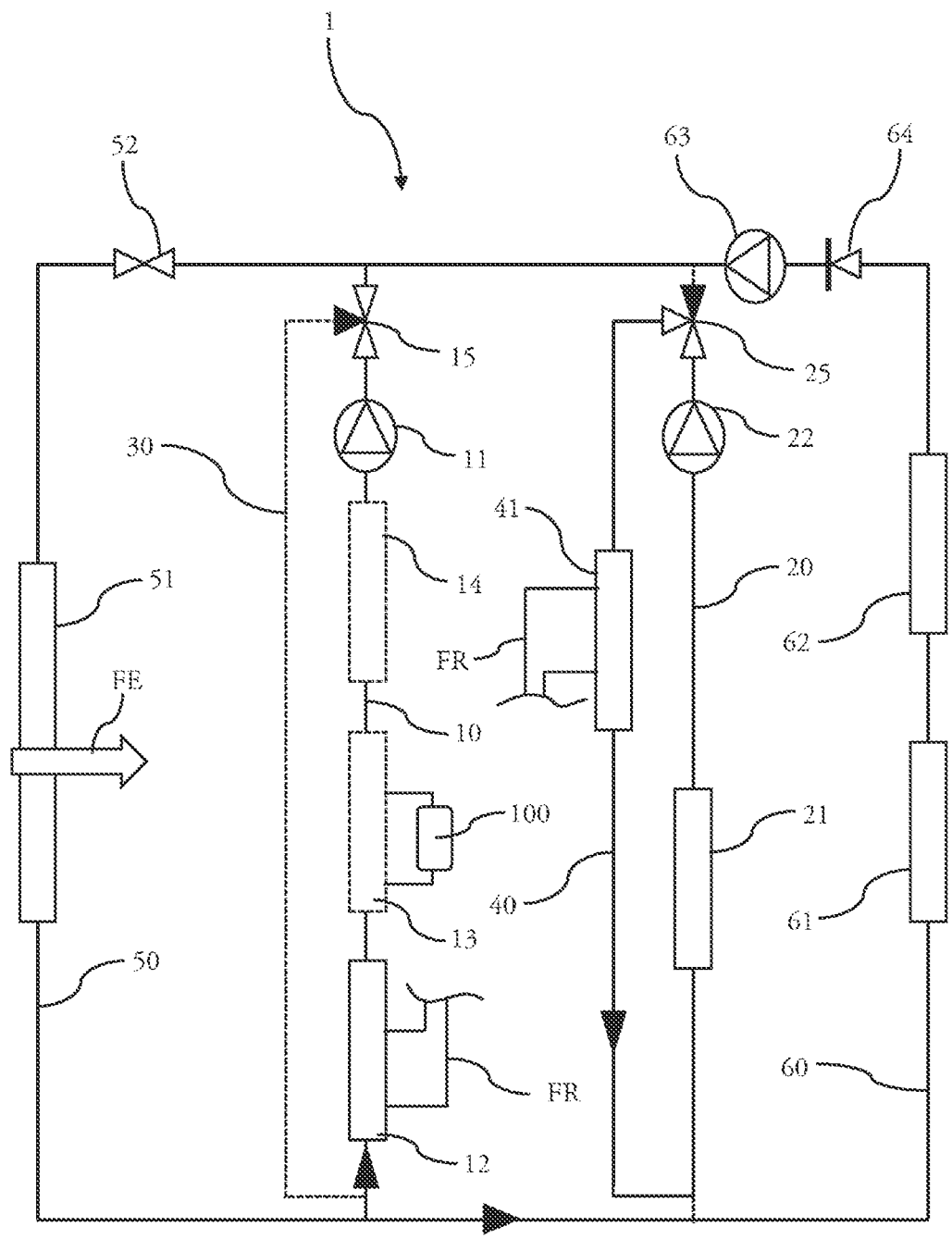

FIG. 7 shows the circuit 1 illustrated in FIG. 4, the circuit 1 being used in a use mode according to the fourth aspect of the invention, this use mode making it possible to cool the first component of the electric powertrain of the vehicle, in particular to cool the battery, the first component of the electric powertrain being thermally coupled to the third heat exchanger 21 situated on the second leg 20.

Thus, the branching device 25 forces the heat-transfer liquid contained in the second leg 20 to circulate between the second leg 20 and the fourth leg 40, the second pump 22 being activated. In other words, the branching device 25 prevents the heat-transfer liquid circulating in the second leg 20 and in the fourth leg 40 from being injected into the first leg 10, the third leg 30, the fifth leg 50 or the sixth leg 60. The heat-transfer liquid therefore passes through the fourth heat exchanger 41, which then operates as an evaporator, configured to exchange heat energy with a refrigerant. The heat-transfer liquid then passes through the third heat exchanger 21, which is thermally coupled to the first component of the electric powertrain of the vehicle, thereby making it possible to cool the latter. Finally, the heat-transfer liquid passes through the second pump 22 before being injected back into the fourth leg 40.

The operating mode illustrated in FIG. 7 also makes it possible to dissipate heat energy picked up at the sixth heat exchanger 61 and/or the seventh heat exchanger 62, which are situated in the sixth leg 60. Thus, the liquid circulating in the sixth leg picks up heat energy generated by the second and/or the third component of the electric powertrain, the second component of the electric powertrain being an electric motor and the third component of the electric powertrain being an electronic power module, which are thermally coupled to the sixth heat exchanger 61 and the seventh heat exchanger 62, respectively, the third pump 63 being activated. The heat-transfer liquid contained in the sixth leg is then directed, in particular by the branching device 25 and the distribution member 15, into the fifth leg 50, the shut-off valve 52 being in an open position allowing the passage of the heat-transfer liquid. The heat energy of the heat-transfer liquid is then dissipated at the fifth heat exchanger 51 through a flow of air FE directed toward the outside of the vehicle interior, the heat-transfer liquid then being injected back into the sixth leg 60 in order to effect a new circulation cycle.

In order to dissipate the heat energy recovered at the heat exchanger 41 of the fourth leg 40, via the refrigerant circuit FR, the first pump 11 is activated, and the heat-transfer liquid circulates in the first leg 10. The heat-transfer liquid then passes through the first heat exchanger 12, in which it is reheated in order to extract the heat energy from the refrigerant, the first heat exchanger 12 being thermally coupled to the refrigerant circuit FR. The distribution member 15 forces the heat-transfer liquid to circulate from the first leg 10 to the fifth leg 50, the heat-transfer liquid then not passing through the third leg 30. The heat-transfer liquid thus mixes with the heat-transfer liquid coming from the sixth leg 60, and then passes through the fifth heat exchanger 51 in order to be cooled by a flow of exterior air FE in order to dissipate the heat energy recovered upon passing through the first heat exchanger 12 of the first leg 10.

Figure 8:
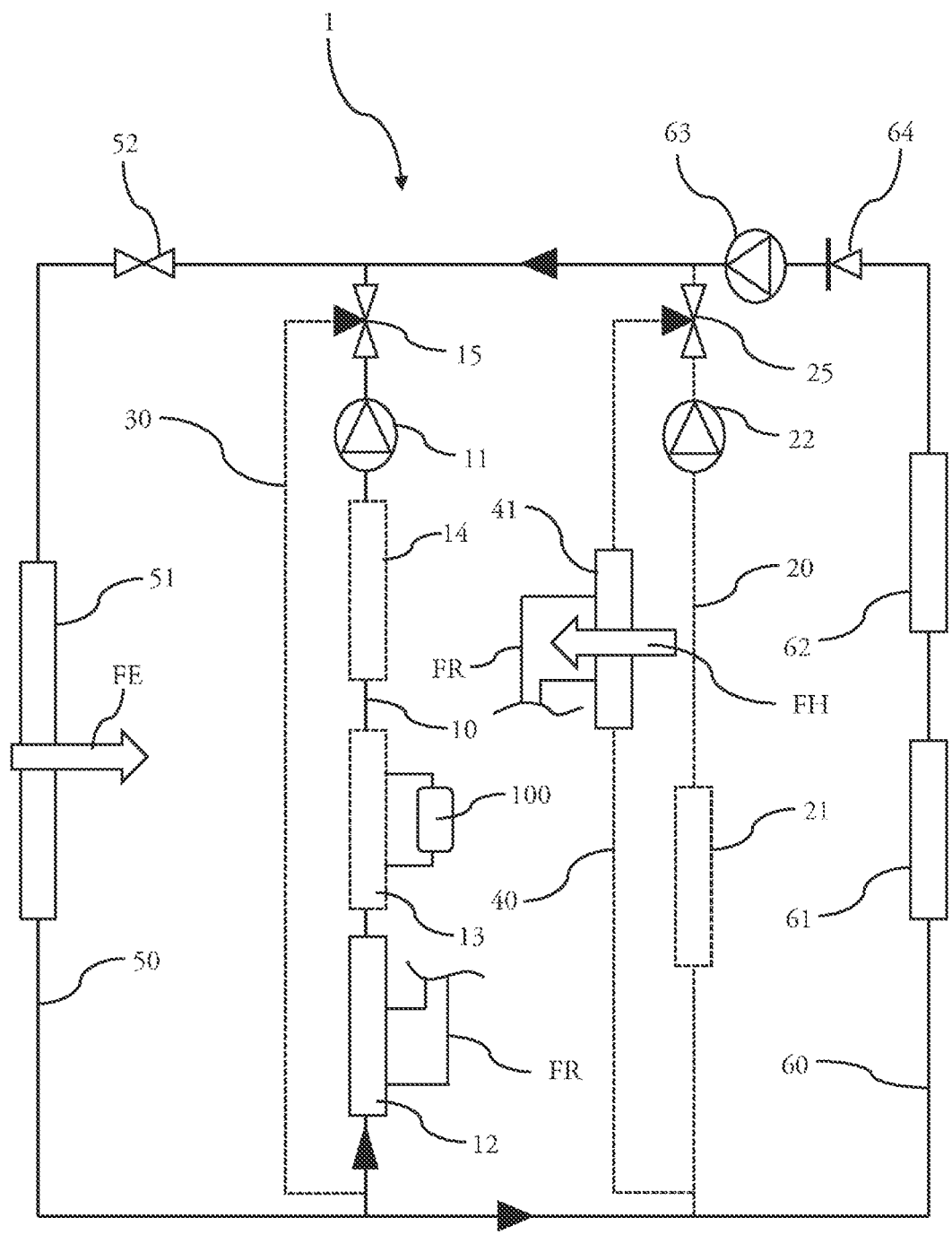

FIG. 8 shows the circuit 1 illustrated in FIG. 4, the circuit 1 being used in a use mode according to the fifth aspect of the invention, this use mode making it possible to cool the second component and/or the third component of the electric powertrain of the vehicle, which are thermally coupled to the sixth heat exchanger 61 and to the seventh heat exchanger 62 of the sixth leg 60, respectively.

Thus, the heat-transfer liquid passes through the sixth heat exchanger 61 and then the seventh heat exchanger 62, thereby picking up the heat energy generated by the second component and the third component of the electric powertrain of the vehicle, the third pump 63 being activated. The heat-transfer liquid is then injected into the fifth leg 50, where it dissipates the heat energy, picked up in the sixth leg 60, at the fifth heat exchanger 51, the heat energy being dissipated by virtue of a flow of exterior air FE. The heat-transfer liquid is then injected into the sixth leg 60 again in order to effect a new cycle.

The operating mode illustrated in FIG. 8 likewise makes it possible to cool the vehicle interior. Thus, with the first pump 11 being activated, the heat-transfer liquid circulates in the first leg 10. The heat-transfer liquid then passes through the first heat exchanger 12, in which it is reheated in order to extract the heat energy from the refrigerant, the first heat exchanger 12 being thermally coupled to the refrigerant circuit FR. Thus, the refrigerant, which is cooled at the first heat exchanger, is directed toward the fourth heat exchanger 41, through which a flow of air FH intended to be sent into the vehicle interior passes, thereby making it possible to cool the latter. Moreover, the distribution member 15 forces the heat-transfer liquid to circulate from the first leg 10 to the fifth leg 50, the heat-transfer liquid then not passing through the third leg 30. The heat-transfer liquid mixes with the heat-transfer liquid coming from the sixth leg 60, and then passes through the fifth heat exchanger 51 in order to be cooled by a flow of exterior air FE in order to dissipate the heat energy recovered upon passing through the first heat exchanger 12 of the first leg 10.

Moreover, in this operating mode, the second pump 22 is deactivated, preventing the heat-transfer liquid from circulating in the second leg 20. In addition, the branching device 25 is configured so as to prevent the heat-transfer liquid from circulating in the fourth leg 40.

Figure 9:
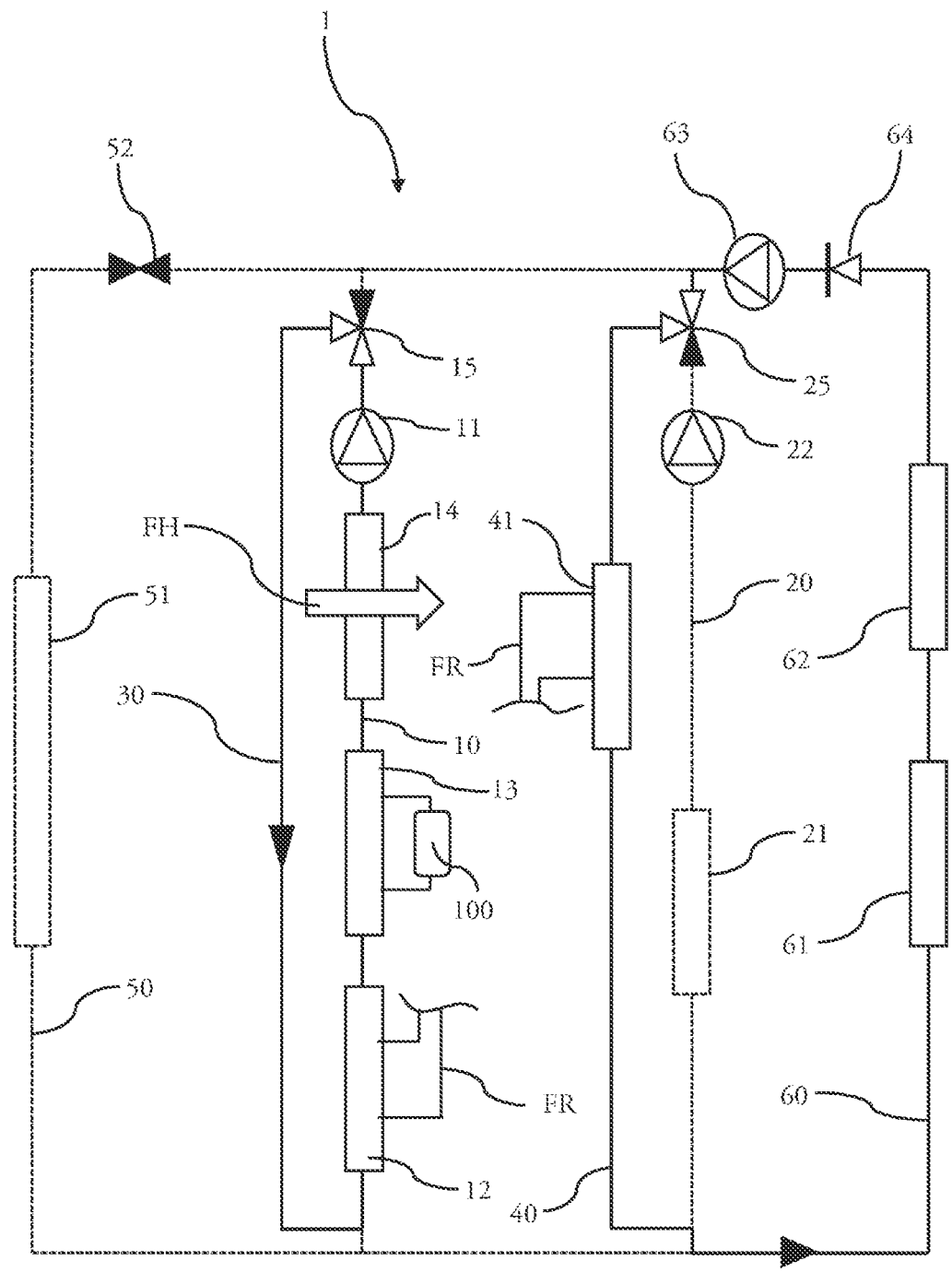

FIG. 9 shows the circuit 1 illustrated in FIG. 4, the circuit 1 being used in a use mode according to the sixth aspect of the invention, this use mode making it possible to cool the second component and/or the third component of the electric powertrain, while avoiding cooling of the first component of the electric powertrain.

Thus, the branching device 25 forces the heat-transfer liquid to circulate from the sixth leg 60 to the fourth leg 40, the third pump 63 being activated. The heat-transfer liquid therefore passes through the sixth heat exchanger 61 and then the seventh heat exchanger 62, which are disposed in series on the second leg 60 and are thermally coupled to the second component and the third component, respectively, of the electric powertrain. The heat-transfer liquid is then directed toward the fourth leg 40 by the branching device 25, the branching device 25 preventing the heat-transfer liquid from circulating in the second leg 20, and the second pump 22 being deactivated. In addition, the shut-off valve 52 is closed, preventing the heat-transfer liquid from circulating in the fifth leg 50.

This configuration therefore makes it possible to direct the heat-transfer liquid from the sixth leg to the fourth leg 40, the heat-transfer liquid dissipating the heat energy, picked up in the sixth leg 60, at the fourth heat exchanger 41, which is thermally coupled to a refrigerant circuit. Thus, the heat energy generated at the first component of the electric powertrain, which is thermally coupled to the third heat exchanger 21, is not dissipated by the heat-transfer liquid in this mode, making it possible, for example, when the first component of the electric powertrain is an energy storage device, to avoid excessive cooling of the energy storage device in order for it to be possible to keep it at a constant temperature.

Moreover, the operating mode illustrated in FIG. 9 also makes it possible to heat the vehicle interior by way of the first heat exchanger 12 used as a condenser, or of the electric heating device 13 supplied with power by the power source 100. Thus, the heat-transfer liquid contained in the first leg 10 circulates between the first leg 10 and the third leg 30, the circulation of the heat-transfer liquid contained in the first leg 10 being forced by the distribution member 15. The heat-transfer liquid picks up heat energy at the first heat exchanger 12 used as a condenser and/or at the electric heating device 13, and dissipates this heat energy at the second heat exchanger 14 in order to make it possible to heat a flow of air FH sent into the vehicle interior.

The first heat exchanger 12 and the fourth heat exchanger 41 are thermally coupled to the same refrigerant circuit FR, the first heat exchanger 12 functioning as a condenser and the fourth heat exchanger 41 functioning as an evaporator. This configuration makes it possible to use the refrigerant circuit FR to realize a thermodynamic cycle in the circuit 1, thereby making it possible to realize two different functions within the circuit 1 on the basis of the refrigerant circuit FR.

It will be understood from the above that the present invention thus makes it possible to ensure the aims set for the invention in a simple manner and at optimized costs, by making available a heat-transfer liquid circuit that is capable of carrying out a function of heating the vehicle interior using an electric heating device or using a heat exchanger used as a condenser, a function of cooling the vehicle interior, a function of heating or cooling a component of the electric powertrain of the vehicle, a function of heating the vehicle interior using a refrigerant loop, and a function of recovering energy from a component of the electric powertrain.

Of course, the invention is not limited to the examples that have just been described, and numerous modifications may be made to these examples without departing from the scope of the invention. In particular, the various features, forms, variants and embodiments of the invention may be combined with one another, in various combinations, as long as they are not mutually incompatible or mutually exclusive. In particular, all of the variants and embodiments described above are able to be combined with one another.

The invention claimed is:

1. A heat-transfer liquid circuit for an electric vehicle that is propelled at least in part by an electric motor, the circuit comprising:
   a first leg comprising:
   at least one pump, a first heat exchanger configured to exchange heat energy between the heat-transfer liquid and a refrigerant, an electric heating device and a second heat exchanger configured to exchange heat energy between the heat-transfer liquid and a flow of air intended to be sent into a vehicle interior;
   a second leg that comprises a third heat exchanger thermally coupled to a component of an electric powertrain of the vehicle,
   wherein the component of the electric powertrain comprises an energy storage device;
   a third leg that is disposed in parallel with the first leg and connected to the latter by a member for distributing the heat-transfer liquid; and a fourth leg that is mounted in parallel with the second leg and connected thereto by a branching device, wherein the fourth leg comprises a fourth heat exchanger configured to exchange heat energy between the heat-transfer liquid and the refrigerant.

2. The circuit as claimed in claim 1, wherein the components of the first leg are mounted in series with one another.

3. The circuit as claimed in claim 1, wherein the electric heating device is interposed between the first heat exchanger and the second heat exchanger.

4. The circuit as claimed in claim 1, wherein the electric heating device is configured to heat the heat-transfer liquid using high-voltage electrical energy.

5. The circuit as claimed in claim 1, wherein the pump is interposed between the member for distributing the heat-transfer liquid and the second heat exchanger.

6. The circuit as claimed in claim 1, wherein the third leg does not have a heat exchanger.

7. The circuit as claimed in claim 1, further comprising a fifth leg disposed in parallel with the first leg, the fifth leg comprising a fifth heat exchanger configured to effect heat exchange between the heat-transfer liquid and a flow of air exterior to the vehicle interior.

8. The circuit as claimed in claim 7, wherein the fifth leg comprises a shut-off valve.

9. The circuit as claimed in claim 7, comprising a sixth leg disposed in parallel with the second leg, the sixth leg comprising a sixth heat exchanger thermally coupled to a component of the electric powertrain of the vehicle, referred to as a second component.

* * * * *